(12) United States Patent
Anhalt

(10) Patent No.: US 11,480,756 B2
(45) Date of Patent: Oct. 25, 2022

(54) TWO-SPEED FOCUSING MECHANISM

(71) Applicant: KARL STORZ Imaging, Inc., Goleta, CA (US)

(72) Inventor: Thomas J. Anhalt, Goleta, CA (US)

(73) Assignee: KARL STORZ Imaging, Inc., Goleta, CA (US)

( * ) Notice: Subject to any disclaimer, the term of this patent is extended or adjusted under 35 U.S.C. 154(b) by 133 days.

(21) Appl. No.: 17/120,602

(22) Filed: Dec. 14, 2020

(65) Prior Publication Data

US 2022/0187562 A1 Jun. 16, 2022

(51) Int. Cl.
| | |
|---|---|
| *G02B 7/04* | (2021.01) |
| *F16H 25/20* | (2006.01) |
| *G03B 13/34* | (2021.01) |
| *F16H 25/24* | (2006.01) |

(52) U.S. Cl.
CPC ............. *G02B 7/04* (2013.01); *F16H 25/20* (2013.01); *F16H 25/24* (2013.01); *G03B 13/34* (2013.01); *F16H 2025/204* (2013.01); *F16H 2025/2059* (2013.01)

(58) Field of Classification Search
CPC ... G02B 7/04; G03B 13/34; F16H 2025/2059; F16H 2025/204; F16H 25/24; F16H 25/20
See application file for complete search history.

(56) References Cited

U.S. PATENT DOCUMENTS

| | | | |
|---|---|---|---|
| 2,407,511 A | 9/1946 | Peck | |
| 2,448,974 A * | 9/1948 | Guttmann | G02B 21/0008 |
| | | | 359/383 |
| 5,264,967 A * | 11/1993 | Marchlenski | G02B 7/04 |
| | | | 359/425 |
| 6,031,663 A | 2/2000 | Funatsu | |
| 6,064,533 A | 5/2000 | Kenin | |
| 6,396,645 B1 | 5/2002 | Nakayama et al. | |
| 6,522,478 B2 | 2/2003 | Nomura | |
| 6,522,482 B2 | 2/2003 | Nomura | |
| 6,961,173 B2 * | 11/2005 | Kinoshita | G02B 21/242 |
| | | | 359/383 |
| 7,436,447 B2 | 10/2008 | Mikami | |
| 7,846,109 B2 | 12/2010 | Parihar | |
| 7,862,518 B2 | 1/2011 | Parihar | |
| 7,978,186 B2 | 7/2011 | Vassallo | |
| 8,184,366 B2 * | 5/2012 | Liang | G02B 21/06 |
| | | | 359/368 |
| 8,858,462 B2 | 10/2014 | Parihar | |

(Continued)

OTHER PUBLICATIONS

Harry Kim; International Search Report, dated Mar. 10, 2022 pp. 1-8, Alexandria, VA Application No. PCT/US2021/063067.

*Primary Examiner* — David M Fenstermacher
(74) *Attorney, Agent, or Firm* — Michael Loi; David Villalpando

(57) ABSTRACT

A two-speed focusing mechanism includes a base having an inner guide, a carrier disposed within the inner guide, a first drive, an outer guide and a second drive. A first and second bearing are disposed in a respective inner dimple of the carrier and a second bearing is disposed within a first dimple of the first drive. The first and second bearings are held within a respective inner slot and outer slot and a first guide and second guide, wherein a rotation of the second drive is translated into an axial movement of the carrier at different speeds.

14 Claims, 9 Drawing Sheets

(56) References Cited

U.S. PATENT DOCUMENTS

| | | |
|---|---|---|
| 2002/0135899 A1 | 9/2002 | Nomura et al. |
| 2003/0103279 A1 | 6/2003 | Anhalt |
| 2022/0121000 A1* | 4/2022 | Iwasaki .................... G02B 7/08 |
| 2022/0128788 A1* | 4/2022 | Yamada ................. G03B 17/14 |
| 2022/0137325 A1* | 5/2022 | Gomibuchi .......... H04N 5/2254 |
| | | 348/345 |
| 2022/0137488 A1* | 5/2022 | Endo ...................... G02B 7/021 |
| | | 396/71 |
| 2022/0163752 A1* | 5/2022 | Sakakibara .............. G03B 5/00 |
| 2022/0187562 A1* | 6/2022 | Anhalt .................... G02B 7/04 |

* cited by examiner

TWO-SPEED FOCUSING MECHANISM

TECHNICAL FIELD

The disclosure relates to a two-speed focusing mechanism. In particular, the focusing mechanism is configured to translate a rotary motion into an axial displacement of a lens at two different speeds.

BACKGROUND

Focusing mechanisms used for instruments such as cameras and microscopes are known. In some instances, the focusing mechanism is a two-speed mechanism. The two-speed mechanism includes a first speed mechanism which is configured to generate a rate of travel of the lens at a first speed and a second focusing mechanism which is configured to generate a rate of travel of the lens at a second speed. The second speed is slower than the first speed.

Such a mechanism is desirable so as to allow the user to quickly adjust the focus at the first speed and slowly adjust the focus at the second speed. Naturally, the user rotates a knob wherein the lens is moved at the first speed and is positioned past an ideal focus and adjusts the focus by a second knob so as to move the lens back at a second speed and adjust the image to the ideal focus. The first speed is commonly referenced as a coarse focus adjustment speed, and the second speed is commonly referenced as a fine focus adjustment speed.

Currently, such focusing mechanisms have two separate controls for each of the speeds. In other aspects of conventional two-speed focusing mechanisms, a single knob is used to actuate a worm-gear, wherein the worm gear may be operable to translate the rotation of a spur gear into a fine focus adjustment. However, such a configuration requires additional packaging space as the spur gear is radial to the worm gear.

Accordingly, it remains desirable to have a focusing mechanism configured to provide a two-speed focus wherein the focusing mechanism utilizes a single rotary motion to focus the lens at two different speeds and wherein the components are contained along a linear axis and configured to be held within the packaging space of a lens housing.

SUMMARY

A two-speed focusing mechanism is provided. The two-speed focusing mechanism is configured to translate a rotary action into an axial displacement of a lens at two different speeds. The two-speed mechanism includes a base. The base has an inner guide. The inner guide is a tubular member having an inner slot.

The two-speed focusing mechanism further includes a carrier. The carrier is disposed within the inner guide and an outer surface of the carrier has an inner dimple. A first drive is a tubular member that is concentric to the inner guide. The inner surface of the first drive includes a first groove. The first groove is helical and has a first pitch and an outer surface of the first drive. The first drive further includes a first dimple.

The two-speed focusing mechanism further includes an outer guide. The outer guide is a tubular member that is concentric to the first drive. The outer guide includes an outer slot. A second drive being a tubular member is concentric to the outer guide. The second drive has an inner surface having a second groove. The second groove being helical and having a second pitch that is less than the first pitch.

The two-speed focusing mechanism further includes a first bearing and a second bearing. The first bearing is disposed within the inner dimple, the inner slot and the first groove. The second bearing is disposed within the first dimple, the outer slot and the second groove. A rotation of the second drive translates the carrier axially at different speeds.

In one aspect, the first pitch is twice as great as the second pitch.

In another aspect, the two-speed focusing mechanism includes a first gasket which bounds an outer surface of the inner guide.

In another aspect of the two-speed focusing mechanism is a carrier includes a lens.

In yet another aspect of the two-speed focusing mechanism, the inner guide includes a pair of inner slots.

In yet another aspect of the two-speed focusing mechanism, the outer slot is shorter than the inner slot.

In yet another aspect of the two-speed focusing mechanism, the second pitch is variable so as to be greater at a center than at an end of the first groove.

In another aspect of the disclosure is a focusing mechanism for a camera is provided. The focusing mechanism includes a base having an inner guide. The inner guide is a tubular member having an inner slot The focusing mechanism further includes a lens cell. The lens cell is disposed within the inner guide. An outer surface of the lens cell has an inner dimple. The focusing mechanism further includes a first drive is a tubular member concentric to the inner guide. An inner surface of the first drive includes a first groove. The first groove is helical and has a first pitch. An outer surface of the first drive includes a first dimple.

The focusing mechanism includes an outer guide. The outer guide is a tubular member concentric to the first drive. The outer drive includes an outer slot.

The focusing mechanism includes a second drive. The second drive includes a tubular member concentric to the outer drive. An inner surface of the second drive includes a second groove. The second groove is helical and has a pitch that is less than the first pitch.

A first bearing is disposed within the inner dimple, the inner slot and the first groove. A second bearing is disposed within the first dimple, the outer slot and the second groove. A rotation of the second drive translates the lens cell axially in the inner guide and the outer guide at different speeds.

In one aspect, the first pitch is at least twice as great as the second pitch.

In another aspect, the first gasket bounds the outer surface of the inner guide.

In another aspect, the lens cell includes a lens.

In another aspect, the inner guide includes a pair of inner slots.

In another aspect, the outer slot is shorter than the inner slot.

In another aspect, the second pitch is variable so as to be different at a center than at an end of the first groove.

Accordingly, a focusing mechanism is provided which allows the user to adjust the focus at two different speeds using a single rotatory mechanism and is compact and configured to be packaged within a lens housing.

DETAILED DESCRIPTIONS OF PREFERRED EMBODIMENTS

A two-speed focusing mechanism includes a base having an inner guide, a carrier disposed within the inner guide, a first drive, an outer guide and a second drive. A first bearing and a second bearing are disposed in a respective inner dimple of the carrier and a first dimple of the first drive. The first and second bearings are also disposed in a respective first groove and second groove of the first drive and the second drive. The first and second bearings are also disposed in a respective inner slot and outer slot of the inner guide and outer guide. The focusing mechanism is configured to translate a rotation of the first drive into an axial movement of the carrier within the inner slot wherein the second bearing is configured to a rotation of the second drive into an axial displacement of the carrier at different speeds.

Figure 1:
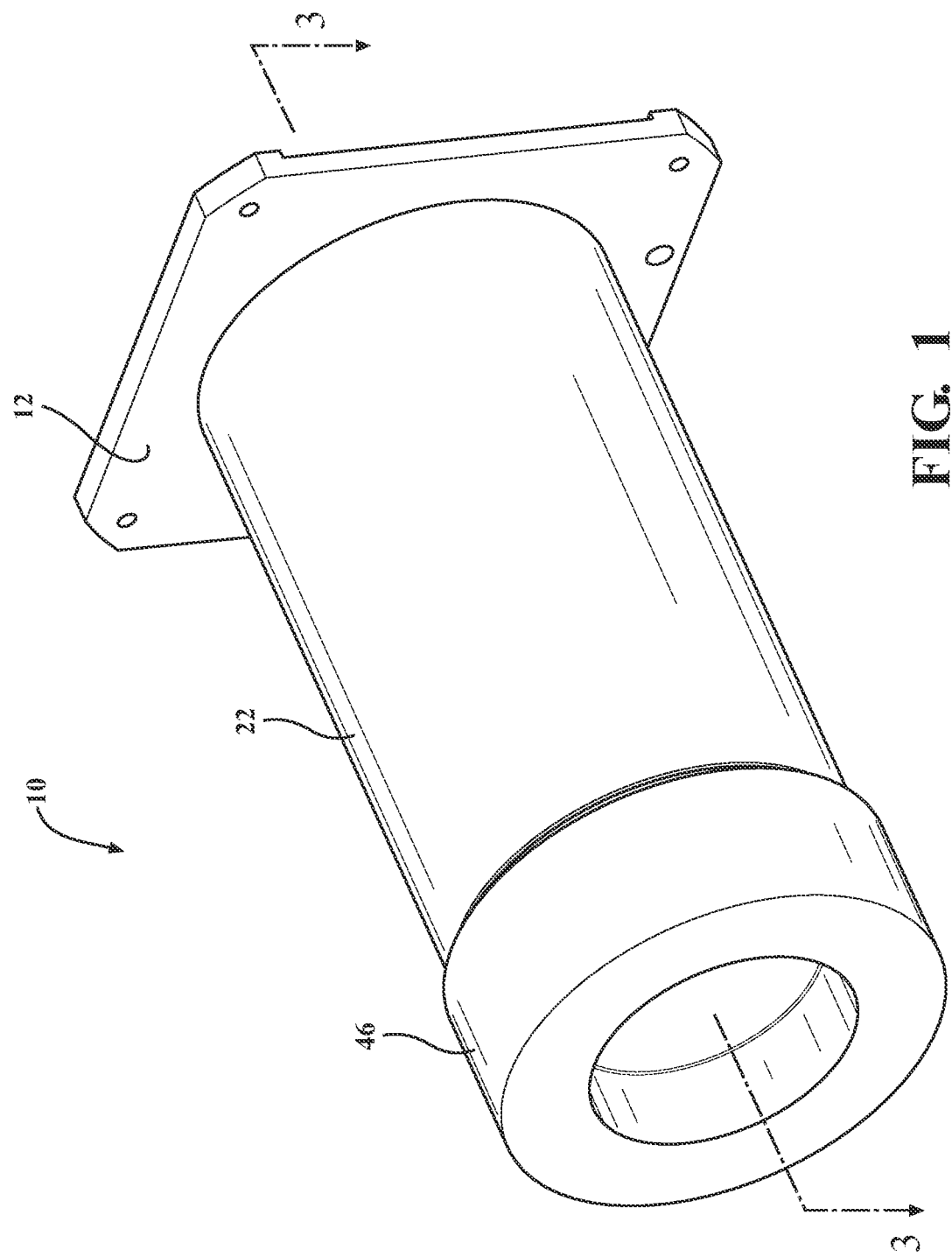
FIG. 1 is a perspective view of a two-speed focusing mechanism according to the principles of the present disclosure.
Figure 2:
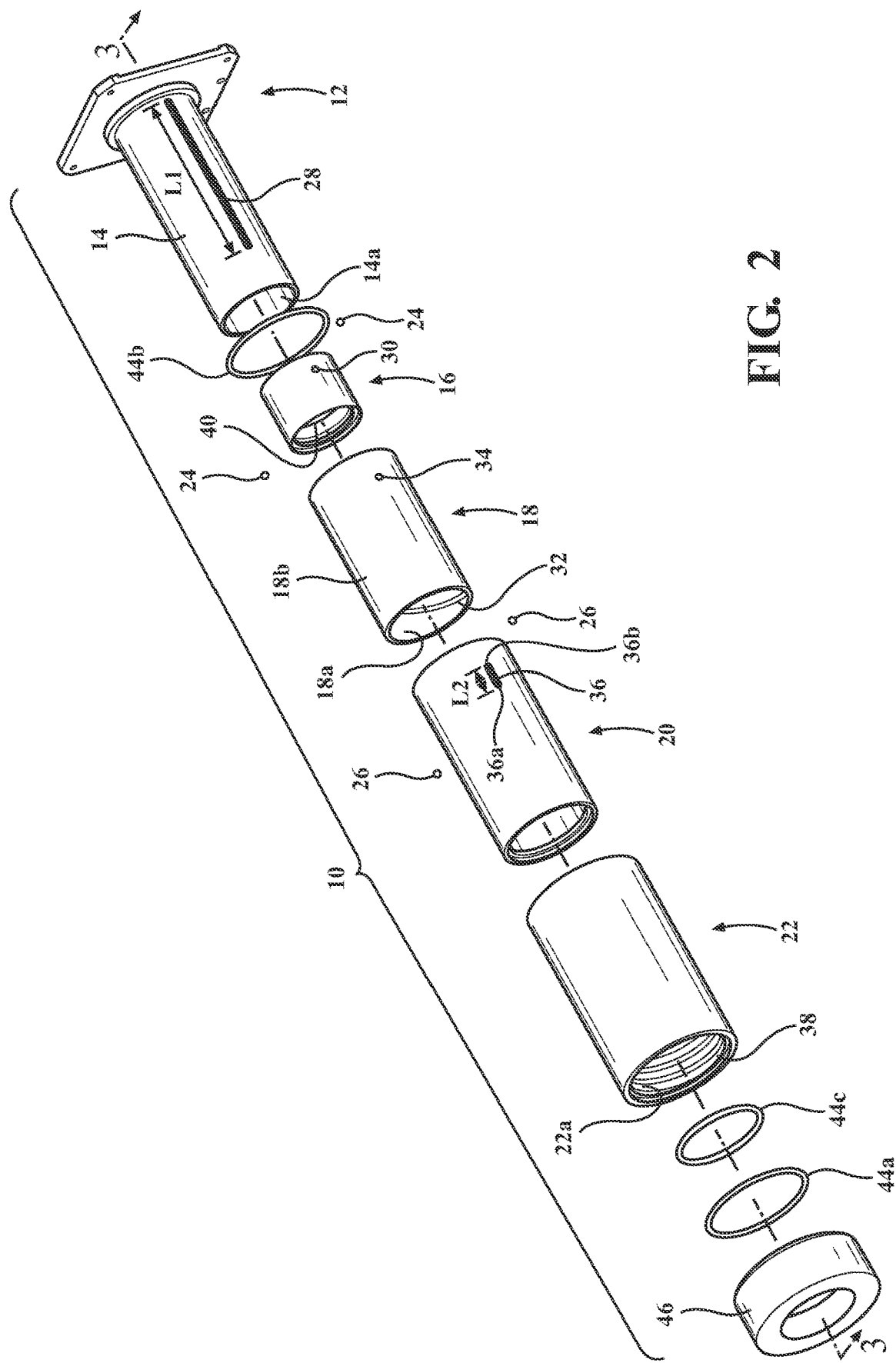
FIG. 2 is an exploded view of the two-speed focusing mechanism shown in FIG. 1.

With reference first to FIGS. 1 and 2, an illustrative depiction of the two-speed focusing mechanism 10 is provided. FIG. 2 is an exploded view of the mechanism 10 shown in FIG. 1. The mechanism 10 includes a base 12, an inner guide 14, a carrier 16, a first drive 18, an outer guide 20, a second drive 22, a first bearing 24 and a second bearing 26.

The base 12, the carrier 16, the first drive 18, the outer guide 20, and the second drive 22 may be formed of a durable and rigid material that may be incorporated in an injection molding process or stamping process. Materials suitable for use herein are illustratively include polypropylene, polyoxymethylene, polycarbonates, aluminum, steel and the like. Preferably the first and second bearings 24, 26 are formed of a durable and rigid material such as steel.

The inner guide 14 is a generally tubular member that has a constant diameter. The inner guide 14 has an open end 14a. The inner guide 14 is rigidly mounted to the base 12, so as to form a closed end opposite of the open end 14a. Alternatively, the closed end may be open to allow an image to pass through to an image sensor or the like. The inner guide 14 further includes an inner slot 28 extending along a first length L1. The inner slot 28 may extend through the tubular member wall and run parallel to a longitudinal axis of the inner guide 14.

The carrier 16 is also a tubular member that has a constant diameter. The diameter of the carrier 16 is smaller than the diameter of the inner guide 14 and is configured to be slidably disposed within the inner guide 14. The carrier 16 is open at both ends so as to provide an optical path. The outer surface of the carrier 16 includes an inner dimple 30.

The first drive 18 is a generally tubular member that has a constant diameter and is open at both ends. The first drive 18 is configured to slide over the inner guide 14 so as to be concentric to the inner guide 14. An inner surface 18a of the first drive 18 includes a first groove 32. The first groove 32 is a helical groove having a first pitch "P1". The outer surface 18b of the first drive 18 includes a first dimple 34.

The outer guide 20 is also a generally tubular member having a length that is generally longer than the length of the first drive 18 and shorter than the length of the inner guide 14. The outer guide 20 is configured to be seated over the first drive 18 so as to be concentric to the first drive 18. The outer guide 20 includes an outer slot 36. The outer slot 36 has a second length L2 which is shorter than the length of the inner slot 28. The outer slot 36 may extend through the tubular member wall and run parallel to a longitudinal axis of the outer guide 20.

The second drive 22 is a tubular member having a constant diameter. The second drive 22 is concentric to the outer guide 20. The second drive 22 includes an inner surface 22a having a second groove 38. The second groove 38 is helical and has a second pitch "P2" that is less than the first pitch "P1".

Figure 3:
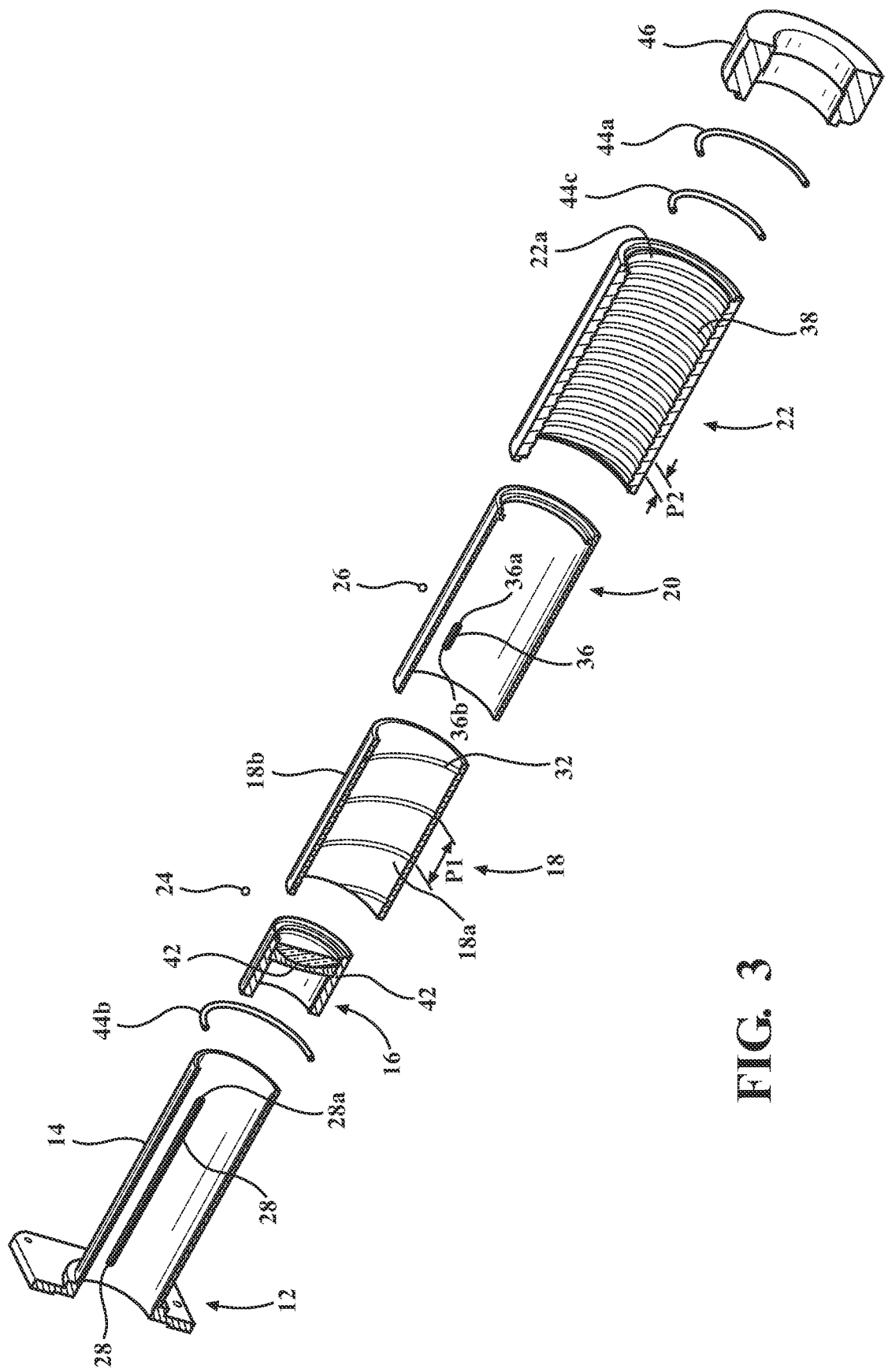
FIG. 3 is a cross section view of FIG. 2 taken along line 3-3.

With reference now to FIG. 3 and also FIGS. 4-7, a description of the assembly of the two-speed focusing mechanism 10 is provided. The carrier 16 is configured to hold an optic device such as a lens cell 40. In one aspect of a carrier 16, the carrier 16 includes a pocket 42 defined by an inner edge bounding an inner surface of the carrier 16. The lens cell 40 is seated in the pocket 42. It should be appreciated that other optical devices, such as a filter, may be disposed within the carrier 16. The carrier 16 may be used to move the lens cell 40 to better focus an image on an image sensor (not shown) disposed in the base 12.

As shown in FIG. 3, in a preferred aspect, the inner guide 14 includes a pair of inner slots 28 which are diametrically opposed to each other and have the same dimension as each other. The carrier 16 is disposed within the inner guide 14. The mechanism 10 may include a pair of first bearings 24 and a pair of inner dimples 30. The inner dimples 30 are diametrically opposed to each other and disposed on the outer surface of the carrier 16. The inner dimples 30 are generally hemi-spherical and have a radius generally the same as the radius of the first bearings 24.

The first bearings 24 are received within (or captured by) inner dimples 30. Thus, when assembled, the first bearings 24 are disposed or enclosed (or captured) within respective inner slots 28 and the carrier 16 is constrained in its axial movement by the length of the inner slots 28. In other words, the first bearings 24 travel along the length of the inner slots 28 and carry the carrier 16 with them. The first bearings 24 are also disposed within the first groove 32 of the first drive 18. As shown, the first drive 18 is concentric to the inner guide 14 and covers the inner guide 14. As such, a rotation of the first drive 18 rotates the first bearings 24 within a respective inner dimple 30 so as to urge the first bearings 24 axially within the inner slots 28. For example, when the groove is a helical groove, the bearings 24 are urged along the helical groove path.

As will be explained in greater detail below, rotation of the second drive 22 either translate the first drive 18 or rotate the first drive 18. The first drive 18 includes a first dimple 34 and the second bearing 26 is disposed within the first dimple 34. Preferably the first drive 18 includes a pair of first dimples 34 which are diametrically opposed to each other. The first dimples 34 are generally hemi-spherical and have a radius generally the same as the radius of the second bearings 26. The second bearings 26 are disposed in each of the first dimples 34 and are constrained within the length of the pair of outer slots 36 formed on the outer guide 20, so as to be diametrically opposed to each other.

The second drive 22 is concentric to the outer guide 20 and includes a second groove 38 as shown in FIG. 3. The second groove 38 has a pitch that is less than the pitch of the first groove 32. As used herein, the term "pitch" is the distance between the threads of the grooves 32, 38 as measured along a length of the respective first and second drive 22. It should be appreciated that the pitch may be designed to provide a specific rate of travel and may be configured so as to provide a predetermined length of travel with respect to a predetermined rotation of the second drive 22. As shown in FIG. 3, the second groove 38 has a pitch "P2" which is significantly less than the pitch "P1" of the first groove 32.

FIG. 3 also depicts the lengths of the inner slot 28 and the outer slot 36. The length of the inner slot 28 is longer than the length of outer slot 36. The length of the second drive 22 is generally the same length as the length of the inner slot 28. Preferably, the inner dimple 30 is positioned from the front end of the carrier 16 so as to place the front end of the carrier 16 at the front end of the inner guide 14 when the first bearing 24 is translated to the distal end of the inner slot 28.

Figure 4A:
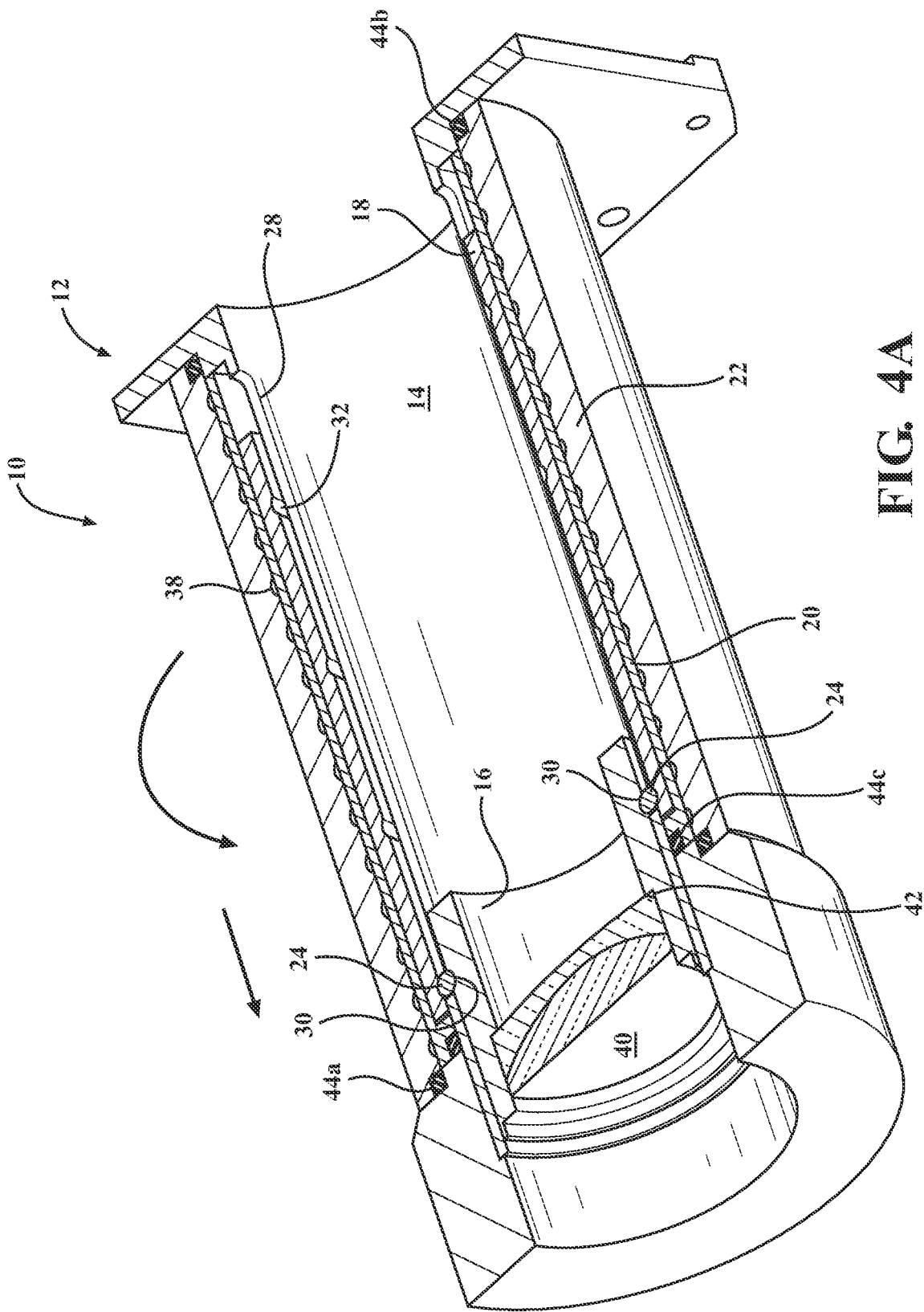
FIG. 4A is a cross sectional view of FIG. 1 showing the two-speed focusing mechanism making a coarse focus adjustment.
Figure 4B:
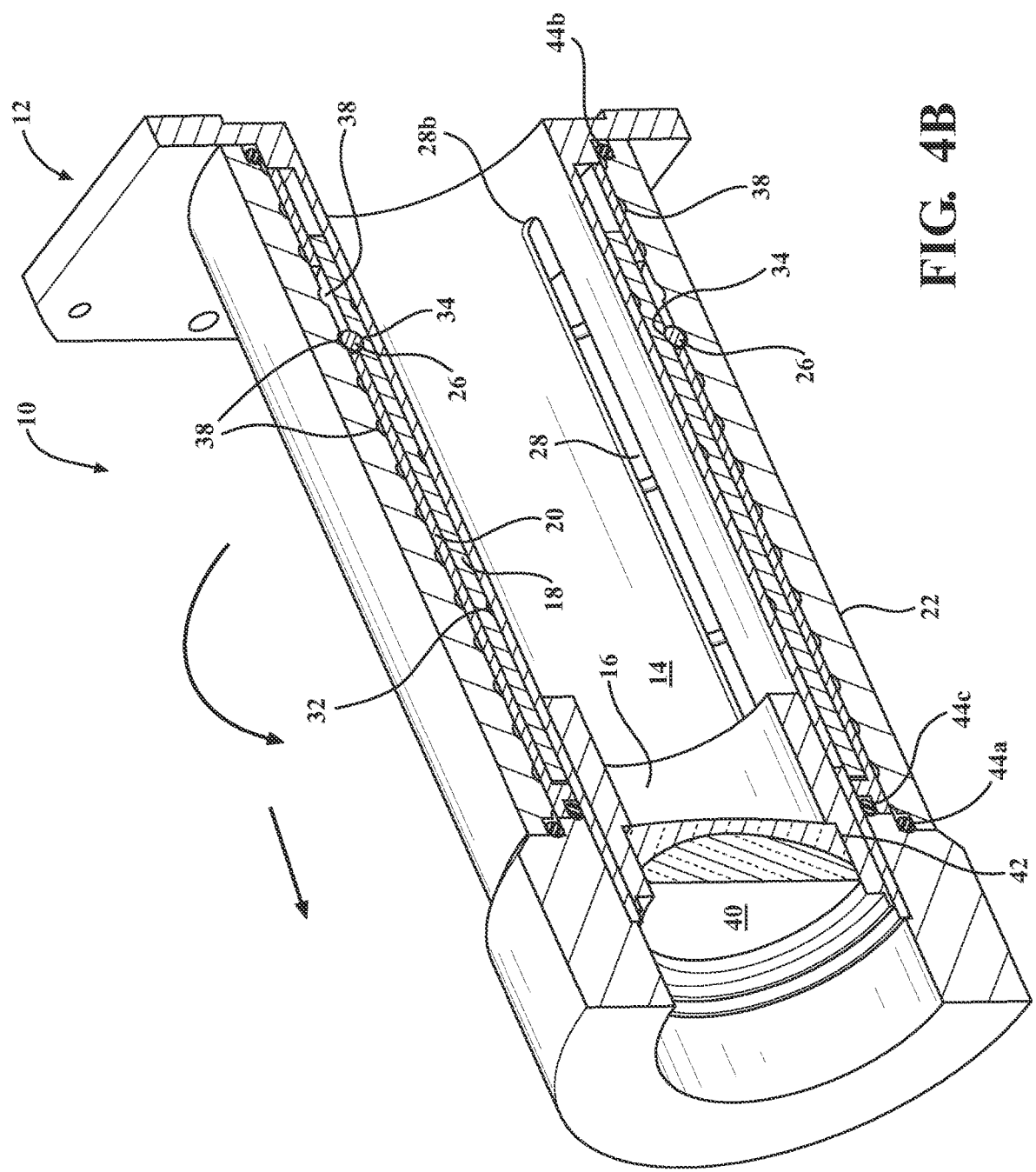
FIG. 4B is a cross sectional view of FIG. 1 showing the two-speed focusing mechanism the first bearing pressed against a distal end of the outer slot.

With reference now to FIGS. 4A and 4B, a description of the operation of the mechanism 10 is provided. The mechanism 10 is designed to provide what is commonly referenced as a coarse focus adjustment and a fine focus adjustment wherein in the coarse focus adjustment, the rate of travel of the lens during the coarse focus adjustment is significantly greater than the rate of travel of the lens during the fine focus adjustment given the same amount of rotation of the second drive 22.

Generally speaking, the coarse focus adjustment is made when the second bearing 26 is moved to one end of the outer slot 36, either end 36a or 36b. As an example, a clockwise rotation of the second drive 22 moves the second bearing 26 from end 36b to end 36a, wherein a continued rotation of the second drive 22 in the clockwise rotation presses the second bearing 26 against the end 36a of the outer slot 36 and causes the first bearing 24 to slide along the inner slot 28 at a rate of travel which is based upon the pitch P1 of the first groove 32 of the first drive 18. The fine focus adjustment occurs when the second bearing 26 travels within the inner slot 28. Thus, the coarse focus adjustment allows the user to move the lens typically past the focal point and then the lens is backed into focus using the fine focus adjustment. Such a feature saves the user time.

FIG. 4B depicts a position of the two-speed focusing mechanism 10 wherein the second bearing 26 is at the end of the outer slot 36. In particular, the second bearing 26 is pressed against a distal end 36a of the outer slot 36. It should be appreciated that the two-speed focusing mechanism 10 is configured to move the carrier 16 along the length of the outer slot 36 using the rate of travel defined by the second groove 38 of the second drive 22. FIG. 4B depicts an instance where the second drive 22 is rotated in a direction indicated by the curved arrow. The rotation of the second drive 22 moves the second bearing 26 in the direction indicated by the straight arrow.

With reference now to FIG. 4A, continued rotation of the second drive 22 pushes the second bearing 26 against the distal end 36a of the outer slot 36 and thus the first bearing 24 is translated along the inner slot 28 in the clockwise direction indicated by the arrow. As the second bearing 26 is limited in travel, the continued rotation of the second drive 22 in the direction indicated by the curved arrow, the first bearing 24 is translated along the inner slot 28 at a rate of travel determined by the pitch P1 of the first groove 32. In other words, a rotation of the second drive 22 advances the second bearing 26 axially to either the distal end 36a or proximal end 36b of the outer slot 36. A continued rotation in the same direction will actuate the first drive 18 wherein the rate of travel is now set by the first groove 32, as shown in FIG. 4A. For illustrative purposes, we will assume that the user has rotated the second drive at a coarse focus adjustment speed and goes past an ideal focus image. Accordingly, the user will need to axially move the lens cell 40 in an opposite direction to bring the image into a preferred focus. The mechanism 10 is configured to bring the image into focus using a fine focus adjustment after the lens cell 40 is moved past focus.

Figure 5:
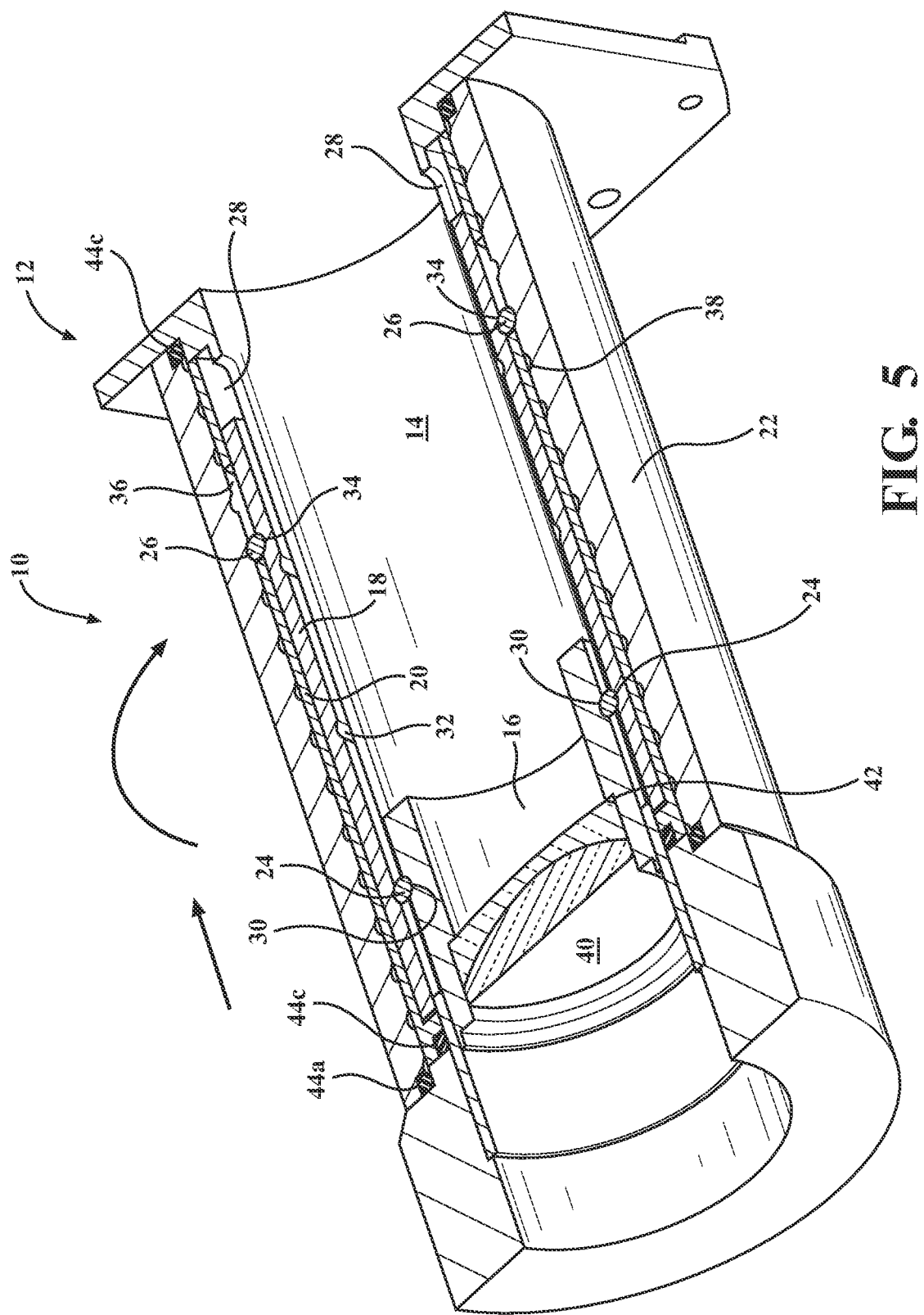
FIG. 5 is a depiction of FIG. 4A showing the two-speed focusing mechanism at one end of a fine focus adjustment.
Figure 6:
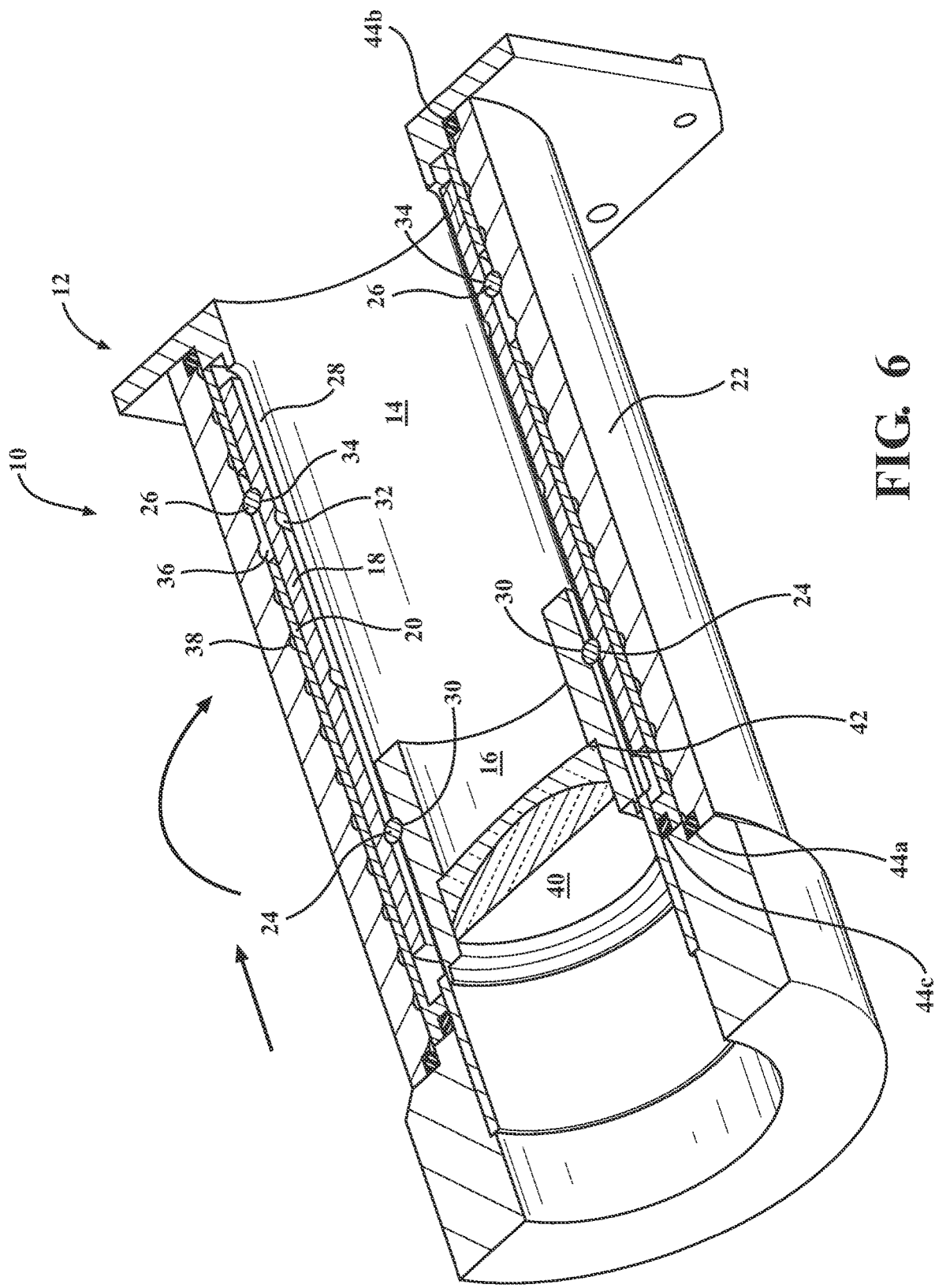
FIG. 6 depicts the two-speed focusing mechanism in the middle of the fine focus adjustment.
Figure 7:
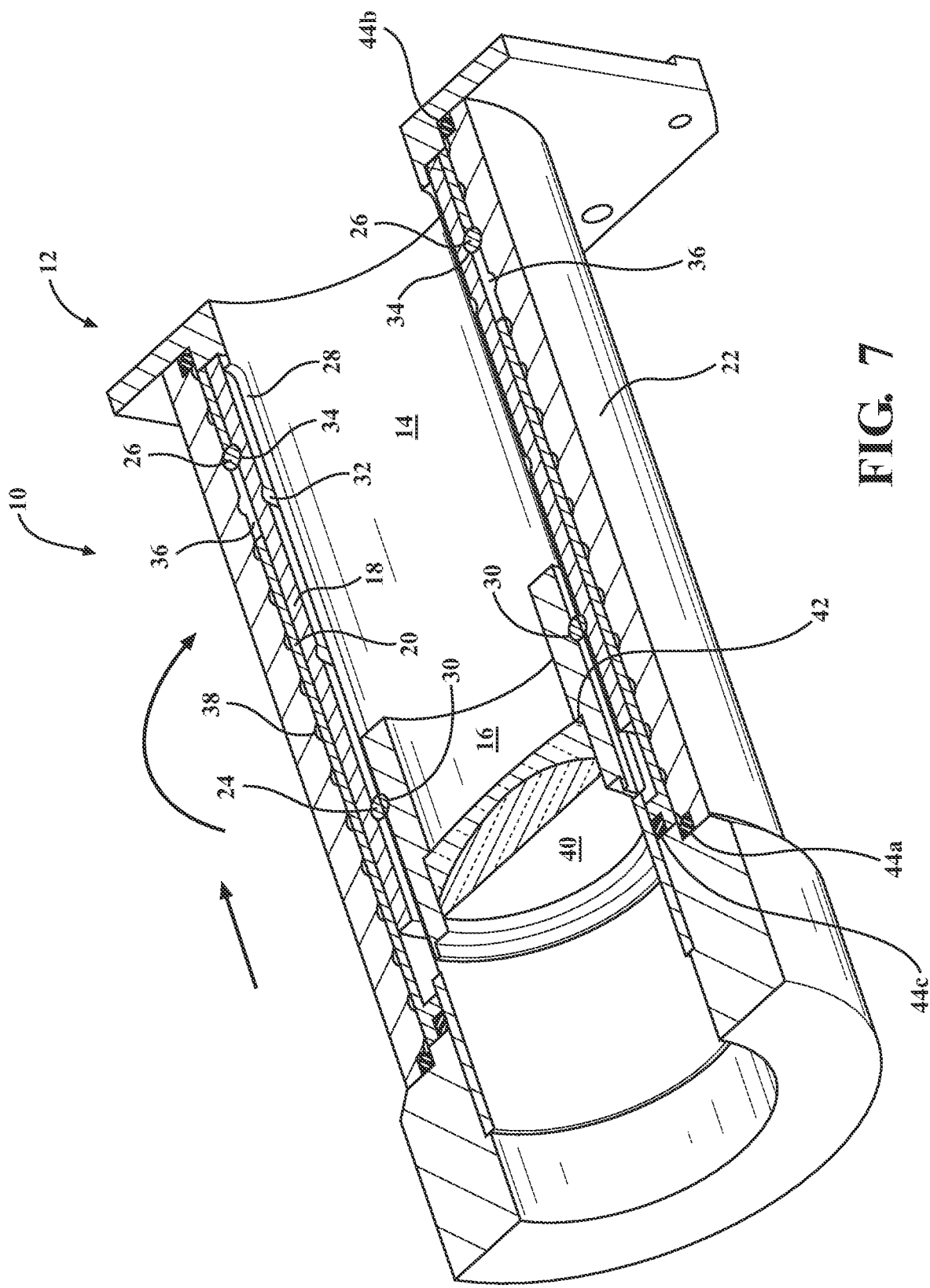
FIG. 7 is a view of the two-speed focusing mechanism showing the other end of a fine focus adjustment.

FIGS. 5-7 show an aspect of the mechanism 10 performing a fine focus adjustment.

With reference first to FIG. 5, the second bearing 26 is disposed on the distal end 36a of the outer slot 36. The second drive 22 is rotated counterclockwise, as indicated by the curved arrow. As there is no structure limiting the advance of the second bearing 26, the rate of travel of the carrier 16 is determined by the engagement of the second bearing 26 within the second groove 38. As such, the rate of travel of the carrier 16 from the distal end 36a to the proximal end 36b of the outer slot 36 is less than the rate of travel when the first bearing 24 is moved along the inner slot 28.

With reference now to FIG. 6, the second bearing 26 is generally centered within the outer slot 36. The second drive 22 is rotated counterclockwise and the second bearing 26 is free to move from a distal end 36a towards the proximal end 36b of the inner slot 28. During the travel along the inner slot 28, the rate of travel of the carrier 16 is significantly less than the rate of travel of the outer slot 36. Thus, the user is able to make a fine focus adjustment within the limits of the outer slot 36. That is, fine focus adjustment is made irrespective of whether the second drive 22 is rotated clockwise or counterclockwise within the distal or proximal ends 36a, 36b of the outer slot 36.

FIG. 7 depicts an instance where the second bearings 24, 26 have reached the proximal end 36b of the outer slot 36 in which case further rotation in a clockwise direction now forces the carrier 16 to ride along the inner slots 28 wherein the first bearings 24 are engaged in the first groove 32 and move at a rate of travel that is greater than the rate of travel of the second bearings 26 within the outer slots 36.

It should be appreciated that the fine focus adjustment range may be based upon the desired number of turns of the second drive 22. In this configuration, the length of the outer slot 36 is dimensioned so as to allow a half turn of the second drive 22 to complete a length of travel of the second bearing from a distal to a proximal end 36a, 36b of the outer slot 36. However, it should be appreciated that the length of the outer slot 36 and the inner slot 28 are provided for illustrative purposes and may deviate from what is shown without narrowing the scope of the appended claims. Likewise, the thread pitch provided for the first groove 32 and the second groove 38 may deviate from what is shown base 12d upon a desired performance of the focusing mechanism 10.

In other aspects, the mechanism 10 may further include friction members 44 and a stop 46. The friction members 44 are configured to generate a rotational drag to help prevent a rotation of inner guide 14 with respect to the second drive 22. In one aspect, the friction members 44 are shown as a gasket commonly known as an O-ring. Such an aspect may be desirable to help retain the inner guide 14 stationary with respect to the second drive 22 during a fine focus adjustment. In one aspect, the friction members 44 include a first friction member 44a and a second friction member 44b disposed on opposite ends of the second drive 22. The first friction member 44a is compressed between an inner surface of the second drive 22 and the stop 46. The second friction member 44b is compressed between an inner surface of the second drive 22 and the inner guide 14. The stop 46 is fixedly mounted to the end of the inner guide 14 so as to retain the second drive 22 in an operational position. In one aspect, an inner surface of the stop 46 is welded to an outer surface of the end of the inner guide 14. A third friction member 44c may be disposed between the stop 46, the inner guide 14 and the outer guide 20. It should be appreciated that the first and second friction members 44a, 44b may also serve to dampen the force generated by the first and second drives 18, 22 against the base 12 and the stop 46. As described above, as the second bearing 26 reaches an end 36a, 36b of the outer slot 36, the continued rotation of the second drive 22 carries the first drive 18. As such, it is the first and second drives 18, 22 which abut against the base 12 or the stop 46 when the first bearing 24 reaches the end of the inner slot 28. The friction members 44a, 44b, and 44c may be formed of a generally durable and resilient material, such as an elastomer, such a nitrile rubber, silicone rubber, thermoplastic elastomer or the like.

It should be appreciated that the speed of travel of the coarse focus is based upon the pitch of the first groove 32. In one aspect, the speed of travel of the course focus may be adjusted so as to slow down the second drive 22 before reaching an end of travel, in one or both directions. Such a feature may be desirable to help dampen the load resulting from the second drive impacting the base 12 or the stop 46.

Figure 8:
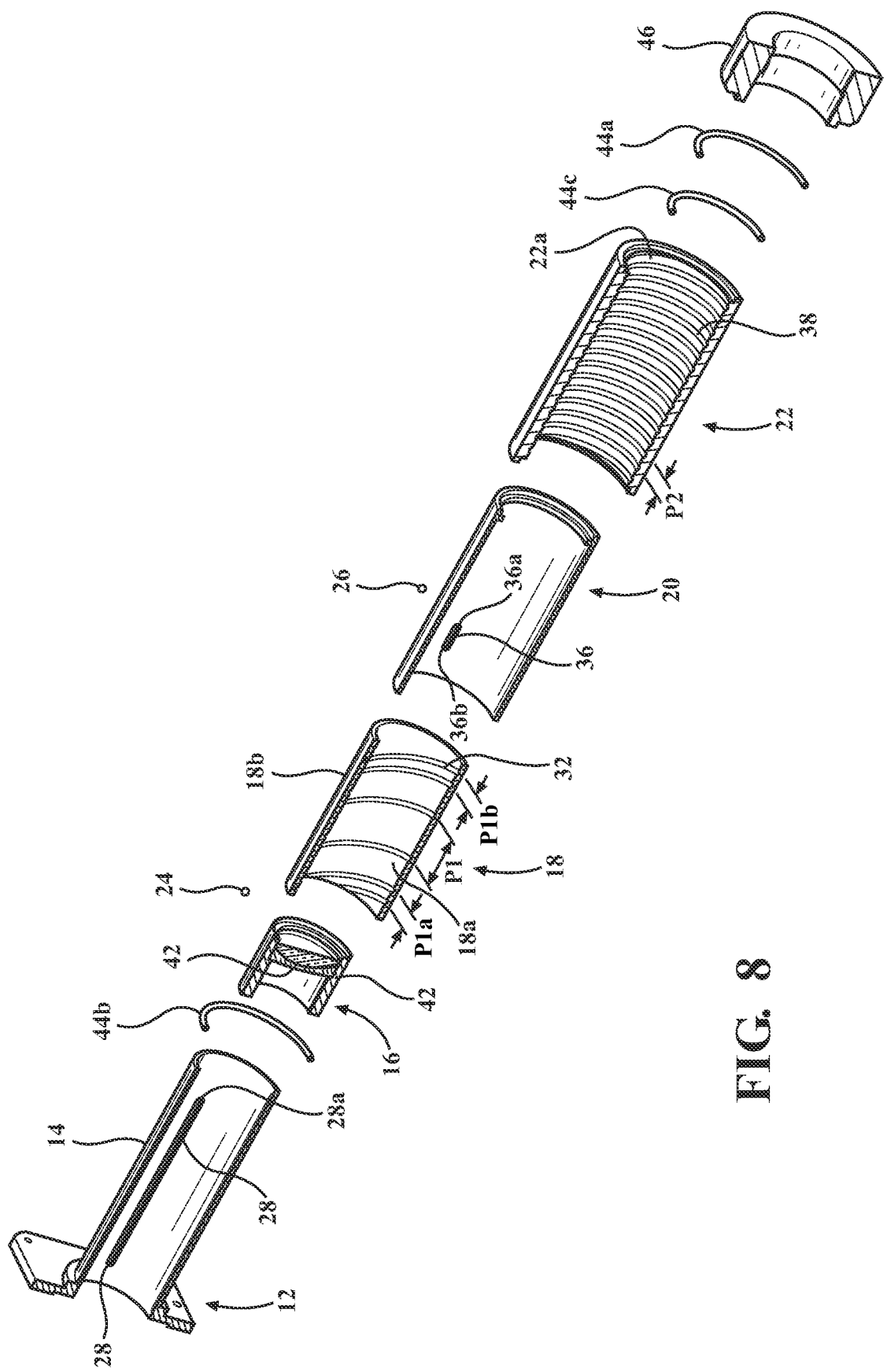
FIG. 8 is view of FIG. 3 showing the first groove having a variable pitch.

With reference now to FIG. 8, the first groove 32 is shown as having a pitch P1 that is variable. In particular, the pitch P1 is smaller at the ends of the first groove 32 relative to the center of the first groove 32. As such, the speed of the second drive 22 is slowed at the ends of travel relative to the center of the first drive 18. FIG. 8 depicts the center of the first groove 32 having a pitch "P1" and the ends of the first groove 32 having a pitch "P1a" and "P1b" respectively. Pitch P1 is greater than pitches P1a, and P1b. Preferably, pitches P1a and P1b are greater than the pitch P2 of the second groove 38. The first groove 32 may be configured to transition gradually from pitch P1 to pitch P1a and pitch P1b so as to provide a smooth tactile response. Accordingly, the first and the second drives 18, 22 are slowed down before impacting the base 12 or the stop 46.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A two-speed mechanism configured to translate a rotary motion into an axial displacement at two different speeds, the two-speed mechanism comprising:
a base having an inner guide, the inner guide being a tubular member having an inner slot;
a carrier disposed within the inner guide, an outer surface of the carrier having an inner dimple;
a first drive, the first drive being a tubular member concentric to the inner guide, an inner surface of the first drive having a first groove, the first groove being helical and having a first pitch, an outer surface of the first drive having a first dimple;
an outer guide, the outer guide being a tubular member concentric to the first drive, the outer guide having an outer slot;
a second drive, the second drive being a tubular member concentric to the outer guide, an inner surface of the second drive having a second groove, the second groove being helical having a second pitch that is less than the first pitch;
a first bearing disposed within the inner dimple, the inner slot and the first groove;
a second bearing disposed within the first dimple, the outer slot and the second groove; and
wherein a rotation of the second drive translates the carrier axially at different speeds.

2. The two-speed mechanism as set forth in claim 1, wherein the first pitch is at least twice as great as the second pitch.

3. The two-speed mechanism as set forth in claim 1, further including a first gasket bounding an outer surface of the inner guide.

4. The two-speed mechanism as set forth in claim 1, wherein the carrier includes a lens.

5. The two-speed mechanism as set forth in claim 1, wherein the inner guide includes a pair of inner slots.

6. The two-speed mechanism as set forth in claim 1, wherein the outer slot is shorter than the inner slot.

7. The two-speed mechanism as set forth in claim 1, wherein the second pitch is variable so as to be greater at a center than at an end of the first groove.

8. A focusing mechanism for a camera, the focusing mechanism comprising:
a base having an inner guide, the inner guide being a tubular member having an inner slot,
a lens cell disposed within the inner guide, an outer surface of the lens cell having an inner dimple;
a first drive, the first drive being a tubular member concentric to the inner guide, an inner surface of the first drive having a first groove, the first groove being helical and having a first pitch, an outer surface of the first drive having a first dimple;
an outer guide, the outer guide being a tubular member concentric to the first drive, the outer guide having an outer slot; and
a second drive, the second drive being a tubular member concentric to the outer guide, an inner surface of the second drive having a second groove, the second groove being helical having a second pitch that is less than the first pitch;
a first bearing disposed within the inner dimple, the inner slot and the first groove, wherein a rotation of the first drive translates an axial movement of the lens cell within the inner slot;
a second bearing disposed within the first dimple, the outer slot and the second groove; and
wherein a rotation of the second drive translates the lens cell axially within the inner guide and the outer guide at different speeds.

9. The focusing mechanism as set forth in claim 8, wherein the second pitch is at least twice as great as the first pitch.

10. The focusing mechanism as set forth in claim 8, further including a first gasket bounding an outer surface of the inner guide.

11. The focusing mechanism as set forth in claim 8, wherein the lens cell includes a lens.

12. The focusing mechanism as set forth in claim 8, wherein the inner guide includes a pair of inner slots.

13. The focusing mechanism as set forth in claim 8, wherein the outer slot is shorter than the inner slot.

14. The two-speed mechanism as set forth in claim 8, wherein the second pitch is variable so as to be greater at a center than at an end of the first groove.

* * * * *